US008816837B2

(12) United States Patent
Braden

(10) Patent No.: US 8,816,837 B2
(45) Date of Patent: Aug. 26, 2014

(54) IN-VEHICLE INFORMATION DELIVERY SYSTEM AND METHOD

(75) Inventor: Jude Braden, Santa Maria del Cami (ES)

(73) Assignee: Itcico Spain, S.L., Palma de Mallorca (ES)

(*) Notice: Subject to any disclaimer, the term of this patent is extended or adjusted under 35 U.S.C. 154(b) by 79 days.

(21) Appl. No.: 13/557,997

(22) Filed: Jul. 25, 2012

(65) Prior Publication Data

US 2013/0300554 A1 Nov. 14, 2013

(30) Foreign Application Priority Data

May 11, 2012 (EP) .................................... 12380024

(51) Int. Cl.
*B60Q 1/00* (2006.01)
*G08G 1/0967* (2006.01)

(52) U.S. Cl.
CPC .................................. *G08G 1/09675* (2013.01)
USPC ........ 340/441; 340/438; 340/439; 340/425.5; 340/936

(58) Field of Classification Search
CPC .................................................. G08G 1/09675
USPC ........... 340/441, 438, 439, 426.6, 936; 701/1, 701/35, 200
See application file for complete search history.

(56) References Cited

U.S. PATENT DOCUMENTS

| | | | | |
|---|---|---|---|---|
| 6,714,859 | B2 * | 3/2004 | Jones | 701/454 |
| 6,748,322 | B1 * | 6/2004 | Fernandez | 701/484 |
| 7,397,365 | B2 * | 7/2008 | Wang | 340/539.13 |
| 2002/0084891 | A1 * | 7/2002 | Mankins et al. | 340/425.5 |
| 2007/0124041 | A1 | 5/2007 | Kwon et al. | |
| 2007/0198160 | A1 * | 8/2007 | Sheynblat | 701/93 |
| 2008/0252487 | A1 * | 10/2008 | McClellan et al. | 340/936 |
| 2011/0148610 | A1 * | 6/2011 | Snider et al. | 340/426.22 |

FOREIGN PATENT DOCUMENTS

| | | | |
|---|---|---|---|
| JP | 2008-273285 | A | 11/2008 |
| WO | WO 2010/065235 | A2 | 6/2010 |

* cited by examiner

*Primary Examiner* — Tai T Nguyen
(74) *Attorney, Agent, or Firm* — Merchant & Gould P.C.

(57) ABSTRACT

An in-vehicle information display system including a GPS receiver that determines the location of a vehicle, and a user interface for communicating information received over a wireless communication network. The information received over the wireless communications network is communicated to a user interface depending on the velocity of the vehicle. Further, the content of the information received over the wireless communications network and communicated to the user depends on the velocity of the vehicle. The system makes use of a head-up display so that content information is only directed to the user. A method communicates information over a wireless communications network to a vehicle.

12 Claims, 4 Drawing Sheets

IN-VEHICLE INFORMATION DELIVERY SYSTEM AND METHOD

This application claims benefit of Serial No. 12.380.024, filed 11 May 2012 in the European Patent Office and which application is incorporated herein by reference. To the extent appropriate, a claim of priority is made to each of the above disclosed applications.

FIELD OF THE INVENTION

The invention relates to the field of information display in a vehicle. More particularly, the invention provides a system for receiving and communicating information to users of a moving vehicle. Further, the invention provides a system and method for receiving and displaying information to users of a vehicle based on the velocity of the vehicle. Furthermore, the invention relates to a method of communicating information to users of a moving vehicle. Furthermore, the invention relates to a method of communicating information to users of a stationary vehicle.

BACKGROUND OF THE INVENTION

The demand for information whilst being mobile provides the basis for continued research with consumers continually requiring new products. In particular, the ease at which information can be delivered whilst being mobile has improved over the past few years with the advent of wireless technology (Le. cellular and/or WiFi™ networks) providing a platform for converged technologies such as cameras, music players and so on to flourish and further with devices such as mobile device running applications on web-enabled devices. In particular however, society appears to be making further demands on the availability of information whilst mobile and in particular whilst traveling by means of a vehicle to different locations.

However, receiving of communication (Le. email, text message, advertisement) whilst in control of a vehicle may be dangerous if the driver of the vehicle is distracted to such an extent that he loses concentration. Moreover, receiving of information that requires a response may equally be dangerous if the driver is of the opinion that he can respond to a message whilst in control of a vehicle.

One recent publication, JP2008273285 discloses an in-vehicle information output device and an in-vehicle information display device capable of outputting and displaying information to a driver in an intuitive manner. The device of JP2008273285 however provides a discriminating device that discriminates whether or not the vehicle is traveling, and an output means for outputting data when it is discriminated that the vehicle is traveling. However, JP2008273285 does not consider transmission of information by means of a wireless network based on the speed of the vehicle. Furthermore, JP2008273285 does not transmit different types of information based on the speed of the vehicle.

In another publication as seen in WO2010065235, a method of operating a location-based advertising server is provided. In particular, the method receives from each advertising publishers an item of advertising content associated with a bounded area defined in a geographic region, and also receiving from each advertising publisher a bid for payment for distributing the advertising publisher's item of advertising content to devices. However, the method of WO2010065235 does not operate on the basis of a vehicle speed but sends an item of advertising content associated with a highest bid to the device.

In another recent publication of US2007124041 to Kwon et al, an apparatus and a method for controlling one or more video display apparatuses installed in a vehicle is provided and comprises a speed detection unit for detecting a speed of a vehicle using a global positioning system and a status detection unit for detecting a status of a parking brake. Further, a video control unit controls the display apparatus so that video contents are displayed when the speed of the vehicle is determined to be below a predetermined speed based on information on the detected status of the parking brake and the detected speed of the vehicle. However, US2007124041 does not disclose the receiving of information over a wireless communication network to a user interface depending on the velocity of the vehicle.

From the foregoing, it can be seen that information and delivery to recipients whilst travelling remains important.

It is therefore an object of the present invention to provide a system that delivers information to a recipient such as a driver of vehicle that ensures that the information is received in a non-distracting manner. It is a further object of the present invention to provide a method for delivering such information in a manner that does not require any driver intervention or interaction. It is a further object of the present invention to provide a method for delivering such information.

SUMMARY OF THE INVENTION

In particular the object is achieved by an information system, in particular in-vehicle information display system, comprising:

- a location determination unit, in particular a GPS receiver, for determining the location and/or the velocity of a vehicle,
- a communication unit for receiving information over a wireless communication network, and
- a user interface for communicating information received over the wireless communication network, wherein the information received over the wireless communication network is communicated to a user interface depending on the velocity of the vehicle. Thus, the content of the information received over the wireless communication network and communicated to the user depends on the velocity of the vehicle. The invention has the advantage of controlling the content of the information/message such that driver safety is maximised and driver distraction is minimised. Preferably, communication to the user is one way only, but the system according to the present invention transmits and receives information relating to the vehicle such as speed of the vehicle.

In one embodiment of the present invention, the speed of the vehicle is determined by a global positioning satellite or alternatively, the speed of the vehicle is determined by a speed sensor in communication with an engine management system of the vehicle. In one embodiment, speed data is transmitted to a service provider by means of a wireless network such as a cellular network.

In another embodiment, speed data is transmitted to a service provider or message server by means of WiFi™ network. The message server might serve the information to the user interface, e.g. over the wireless network.

In another embodiment, speed data is transmitted to the message server by a combination of cellular network and WiFi™ networks. The message server can be adapted to receive from at least one client computer messages, to store the messages and to derive the information communicated over the wireless communication network from at least one of the messages.

Preferably, the messages may contain information relating point of interest messages and/or traffic flow disruption messages and/or emergency type messages from police agencies, and/or social media messages and/or healthcare messages and/or synchronised diary and appointments messages and/or news messages and/or advertisements. Further, the messages may be dependent on a user's profile and/or lifestyle. Generally, the information for a particular vehicle/person might be filtered by the message server.

Furthermore, the messages displayed to a user by means of a user interface in a vehicle may be a Head-Up-Display device/Head-Up-Display and/or audio output and/or smart phone.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings of which.

DETAILED DESCRIPTION OF THE INVENTION

Figure 1:
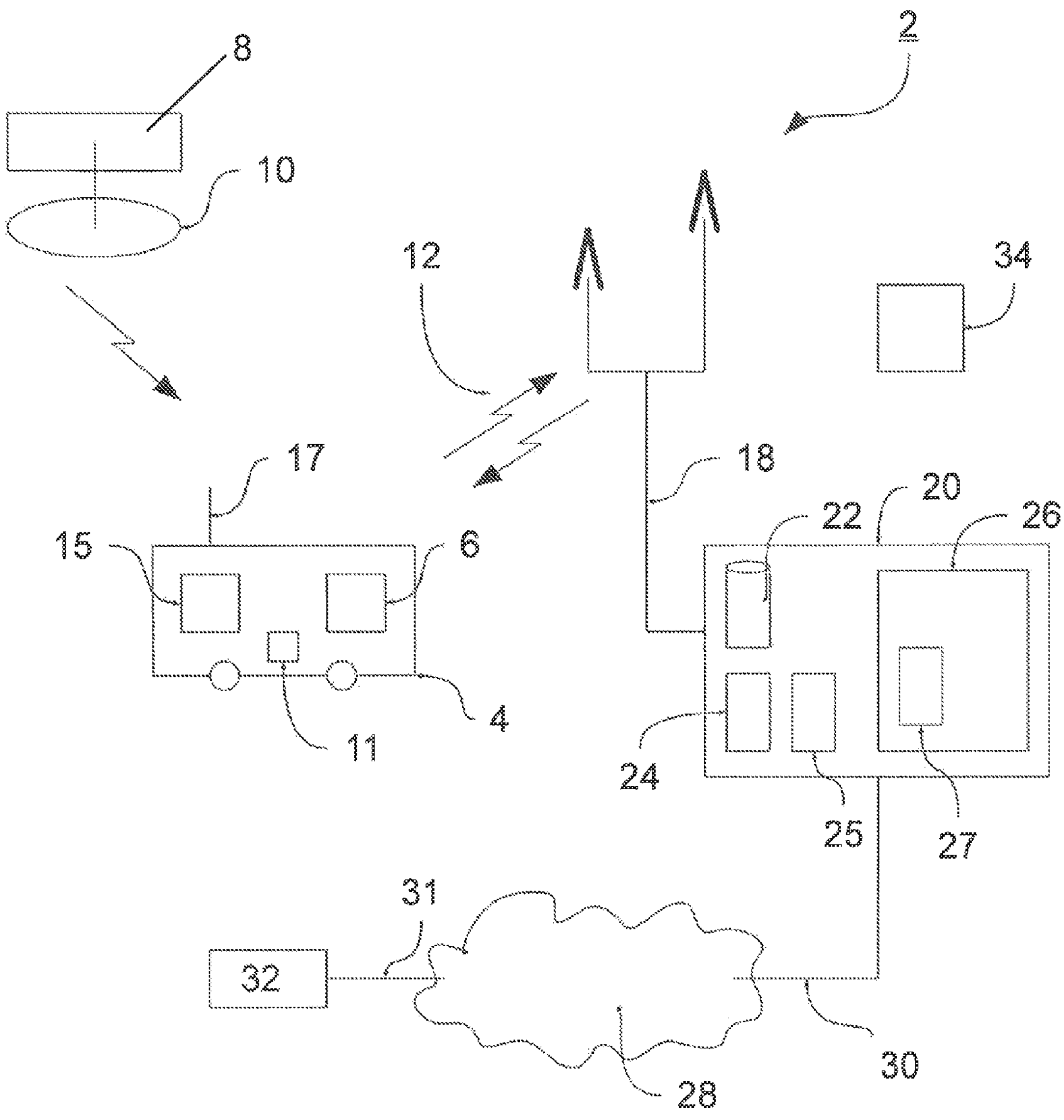
FIG. 1 shows a block diagram of the in-vehicle information delivery system according to an embodiment of the present invention.

FIG. 1 shows a simplified diagram of the information system 2 according to an embodiment of the present invention. FIG. 1 is shown in block diagram form for the purposes of clarity. The information system 2 is generally defined of several modules distributed over a (wide) geographical area. In particular, the information system 2 comprises a vehicle 4 with for example a display 6 and an on-board computer 15, a global position satellite system 8 (GPS) with a GPS satellite 10, a wireless communication network 12 which enables communication between the on-board computer 15 and a message server 20. The message server 20 comprises at least a database 22, a user interface, and a control server 26 which further comprises a processor 27.

In one aspect of the present invention, vehicle 4 comprises a head-up display (HUD) 6 which projects content information on a window (not shown) for an occupant of vehicle 4. In a preferred embodiment, display 6 projects information on the windscreen for the driver of vehicle 4. However, it can be envisaged that display 6 projects content information on any window of a vehicle 4 and therefore to any occupant. The brightness of the content information projected by display 6 may be user configurable depending on the either low or bright light conditions. Similarly, the size of the image projected on the window may be user configurable. For example, it is envisaged that information relating to traffic flow interruptions may be of a different size to messages relating to e.g. weather information.

Vehicle 4 also comprises an antenna 17 that connects to the on-board computer 15. On-board computer 15 comprises at least a processor wireless transceiver (not shown) that determines which communication standard provides the best Quality of Service for communicating with a service provided by the message server 20. That is, the at least one wireless transceiver of the on-board computer 15 may operate according to a cellular network 12 such as the standards of GSM, GPRS, EDGE or CDMA. Alternatively, the wireless transceiver may operate according to WiFi™ standards. Further, wireless transceiver may operate, in addition, on any other wireless standard currently available or available in the future that allows transmission and reception of data to a message server 20. Preferably however, the wireless transceiver of the on-board computer 15 operates according to cellular standards when vehicle 4 is in a non-urban area and hands over by means of the on-board computer 15 to a combined cellular and WiFi™ network when in an urban area. The on-board computer 15 and the at least one transceiver may be powered by the power supply of the vehicle 4 or may be powered, as will be clearer later, by its own power supply.

Wireless network 12 and wireless transceiver of the on-board computer 15 provide bi-directional signaling there between. That is, packet data can be received and transmitted by wireless transceiver of the on-board computer 15 whilst vehicle 4 is stationary or non-stationary. Wireless network 12 may be connected to the message server 20 by means of a public switched telephone network (PSTN) 18 such that when vehicle is non-stationary, and traverses between different cellular base stations, a near permanent transmission connection is established between the on-board computer 15 of vehicle 4 and message server 20.

Vehicle 4 also comprises a GPS receiver 11 which determines the location of the vehicle 4 at any given time from information of the GPS satellite 10. As will be understood later, global positioning satellite 10 also provides velocity information of the vehicle 4 which may be received by an engine management system (not shown) of the vehicle 4 or the on-board computer 15. However, velocity information of the vehicle 4 may be generated by a speed sensor that is connected to an engine management system of the vehicle 4. Preferably, velocity information is stored on a storage device of the on-board computer 15.

The determined velocity of the vehicle 4 is processed by on-board computer 15 and periodically transmitted by means of wireless network 12 and network 18 to the message server 20. However, message server 20 may request the velocity of the vehicle at any given moment by sending a request to the wireless network 12 which in turns provides the request to on-board computer 15.

Accordingly, on-board computer 15 responds with an acknowledgment and under such conditions, generated velocity information, either by means of GPS system 8 or speed sensor, is transmitted over wireless network 12 and then to message server 20 by means of network 18. Preferably, location information of the vehicle 4 is also transmitted by means of networks 12, 18 to message server 20.

Message server 20 comprises at least the database 22 for storing content information (e.g. messages), an input device 24 for allowing users to select and modify the contents of database 22 and a control server 26. Message server 20 may further store user details or put another way, may store subscriber information.

Such subscriber information may be anyone of age, gender, potential characteristics of their lifestyle, occupation, wealth, and other personal details such as holiday tendencies. Such subscriber information may therefore be utilised by message server 20 to provide pertinent information to the user. E.g. message server 20 may have filter criteria for messages stored on the message server 20. These filter criteria might be matched e.g. with the subscriber information and appropriate messages might be selected based on the result of the matching. The message server 20 can be adapted such that only the selected messages or information derived from those messages will be transmitted to the respective subscriber.

Further provided is a network adapter 25 which serves the purpose of establishing an interface between message server 20 and network 18. Adapter 25 may, as will be described in more detail later, provide an interface between the internet 28 and a computer terminal 32 such as a PC, Smartphone, or any other web enabled device connected by means of communication link 30, 31. Content information (e.g. messages) stored on database 22 can be predetermined by a client or may be provided by a client in substantially real-time. That is, content information may be transmitted to user of vehicle 4 over networks 12, 18 depending on the velocity of the vehicle 4. In both cases however, information may be input to message server 20 by means of user interface 24 or may be provided by means of an interface (not shown) residing on computer terminal 32. That is, computer terminal 32 may be remote from message server 20 to provide greater flexibility of information system 2. The filter criteria might also be considered.

Figure 2:
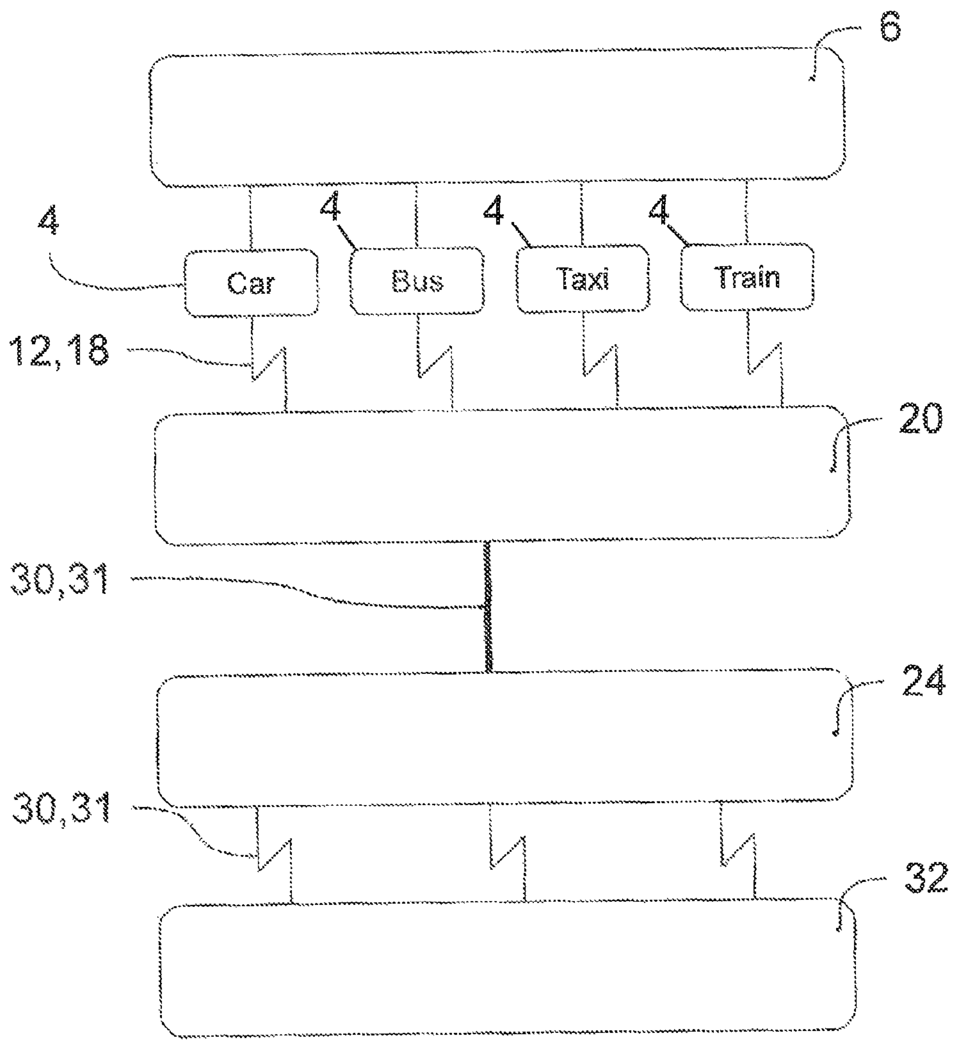
FIG. 2 shows a block diagram of the relationship between a client/server interfacing with a vehicle with information provided to a user of a vehicle according to the present invention.

FIG. 2 shows a block diagram illustrating the relationship between a client/server interfacing with a vehicle with information provided to a user of a vehicle according to the present invention. In the current figure, user interface 24 for receiving content information may be separate from message server 20. That is, user interface may, and as previously described, form part of a remote computer(s) that is either connected over networks 12, 18, 30, 31. As discussed computer terminal 32 may be a PC, Smartphone, or any other web enabled device.

In such configuration, several clients may connect to message server 20 to allow several different types of messages and from several different suppliers to inform a user of a vehicle. For example, one message supplier may be synonymous with fast food outlets, whilst another message supplier may be synonymous with the provision of sport results. However, in both examples, it is envisaged that the user of a vehicle can select whether he wants to receive general messages associated with advertisements or to receive messages based on a pre-selected criteria such as non-advertisement, for example messages relating to sport results.

The type and content of the message received by the user of the vehicle is dependent on the velocity of the vehicle. That is, if the vehicle is travelling at a speed close to the speed limit of the road then the message displayed by means of display 6 is very limited and system-restricted for driver safety considerations. For example, a message may be displayed on display 6 of a notification that an email has been received into a user email account. Conversely, if the vehicle is determined to be static, and using the above example, not only is notification of an email received, but the contents of the email may also be displayed on display 6.

Similarly, the user of the vehicle may be notified of an entry in his social media account. Again, and depending on the speed of the vehicle, the displayed message may either be a graphical symbol (icon) relating to the account, or the message entry itself. However, the display 6 may be orientated in such a way that only the intended recipient of the message can view the displayed message.

Further however, messages may be classified as urgent traffic safety information and provided by means of traffic monitoring message supplier. In this situation, the user of a vehicle 4 may be notified to reduce the speed of his vehicle in view of a traffic accident further ahead. That is, such information provided by a traffic monitoring supplier may have a remote station such as computer terminal 32 which is connected by means of and through internet 28 to message server 20. Optionally, any supplier may send their messages to message server 20 by another communication means such as email for example.

In another example, a traffic monitoring message supplier may monitor the flow of traffic on a road network by means of several cameras (not shown). In this particular example, notification of upcoming traffic delays may be made to a user of a vehicle by re-broadcasting the outputs of the traffic monitoring cameras as a snapshot or as a short video stream over networks 18 and 12. Further, such snapshot image may only be received if the vehicle is moving at a predetermined velocity. Similarly, such a short video stream may be transmitted for example if the vehicle is stationary or near stationary. That said, the traffic monitoring message supplier may elect to send a short traffic bulletin to the user such that the length of tailback may be viewed and optionally to hear an audio report by means of a vehicle audio system.

Figure 3:
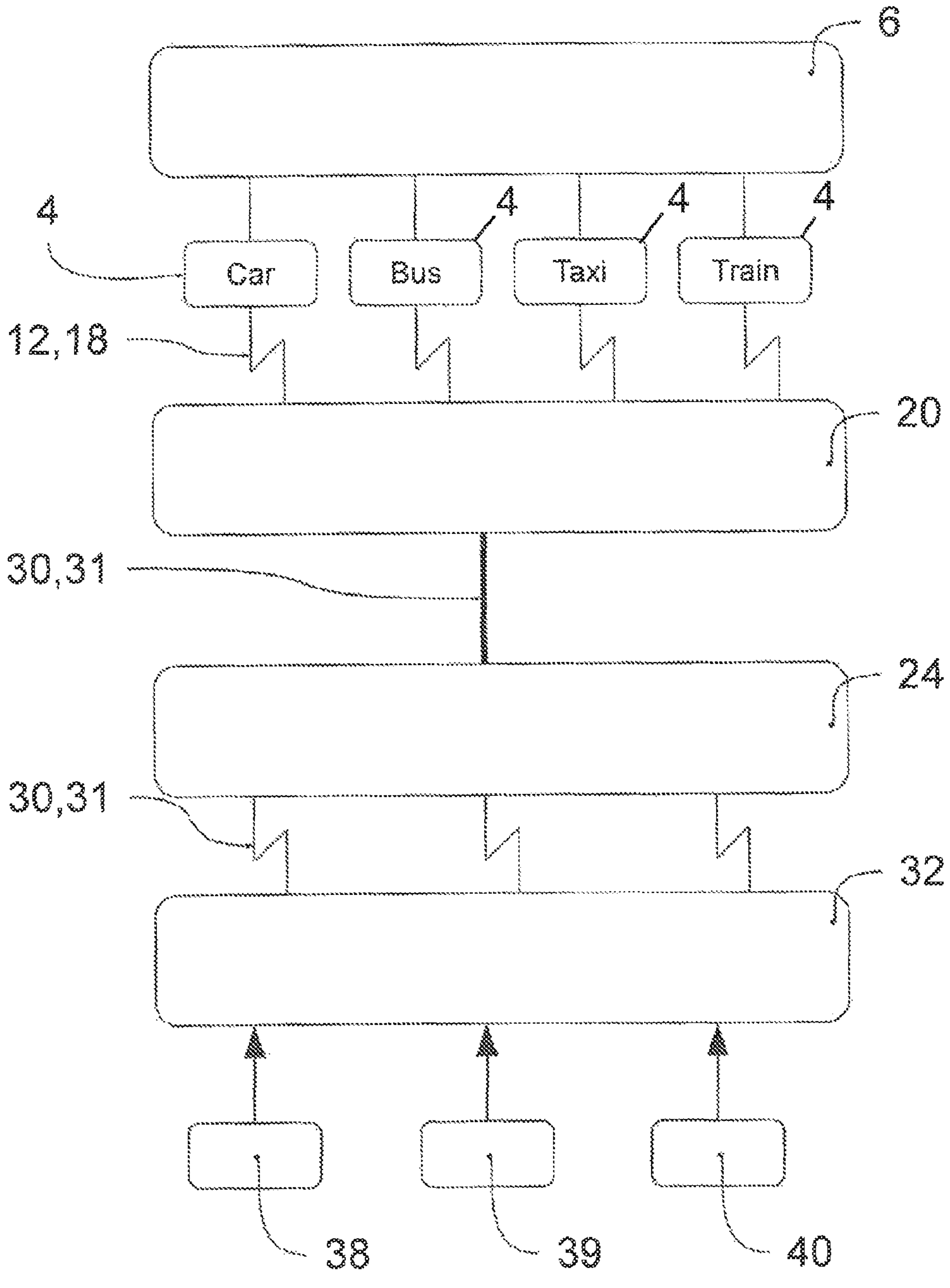
FIG. 3 shows a block diagram of the relationship between a client/server interface with various information sources, with such information provided to a user of a vehicle according to the present invention.

FIG. 3 shows, similar to FIG. 2, a block diagram illustrating the relationship between a client/server interface with various information sources. However, in the current figure, different message suppliers can interact with the subscriber. That is, messages may be public messages 38, private messages 39, and/or commercial messages 40. In the case of public messages 38, it is envisaged for example that a vehicle travelling a known route as determined by global positioning satellite 10, may pass several points of interests. In such configuration, a tourist board may send a message to a user of a vehicle that, and given his current speed, that the point of interest may be near. Of course, such a point of interest may only be flagged to the subscriber (or user) based on the subscriber information stored on message server 20. For example, the subscriber may have interests in historical architecture and the point of interest may be a castle. That said, depending on the speed of the vehicle, a message may be displayed on display 6, such as an icon being representative of a castle. If the message server then determines that the vehicle has stopped, then further information relating to the point of interest may be displayed. Further, the information system 2 according to the present invention may then, based on the current location, determine the best route to the point of interest and display such information together and optionally with a map.

Similarly however, private messages 39 may be displayed on display 6 of vehicle 4. In such a configuration, the user may have a subscription account with any of the currently available social media networks such as Facebook™ Twitter™ and so on.

Accordingly, any new content associated with such networks may be notified to a user of a vehicle by displaying a message icon on display 6 of vehicle 4. However, not to interfere with the safety and operation of the vehicle, message server 20 establishes the speed at which the vehicle is travelling so that either a full message is displayed or alternatively and if the vehicle is non-stationary only a icon being representative of the social media account is shown on the display 6 of vehicle 4.

As previously mentioned, transceiver of the on-board computer 15 may be powered by the power supply of the vehicle 4 or may be powered by its own power supply. That is, transceiver may be powered by power supply of the vehicle during occurrences when the vehicle is not-stationary, and may be powered by its own power supply when the vehicle is stationary such that the power supply of the vehicle 4 is not discharged. Preferably, the speed of the vehicle is transmitted over networks 12, 18 to message server 20 either continuously or at predetermined intervals. That is, transmitting speed data continuously to message server 20 would provide a requirement to process a high volume of data traffic and it is envisaged and being preferable that speed data is communicated to message server 20 either by request or otherwise at a predetermined frequency. Such frequency, may be based on several variables, such as average speed of the vehicle, distance to destination and/or requirement settings of the user.

Further shown in the current figure, and as briefly discussed, the contents of messages shown on display 6 may be commercial nature. For example, a user may elect to supply subscriber information detailing his preferred dietary eating habits and may further elect to supply information such as choice of fast food restaurants to message server 20. That is, such a fast food outlet may therefore provide target advertising on display 6 of vehicle 4 when such a vehicle is in the vicinity of the fast food outlet.

In particular, and as previously discussed, the length of the content of the advertisement displayed on display 6 of the vehicle 4 may be restricted whilst the vehicle 4 is moving, but yet may provide further and detailed information such as current offers, discounts and so on when the vehicle has stopped. Optionally, the advertisement fast food outlet may elect to send a separate communication to the user by means of a 'smart phone', such communication optionally being a discount voucher to be redeemed within a limited time period. In another example, the user may elect to provide renewal dates of for example motor insurance, and home insurance and so on to message server 20, such that an insurance organisation may send a timely reminder for display 6 on vehicle 4 that further payments are required.

Optionally, the head-up display is replaced with a 'smartphone' which may determine the speed of the vehicle by means of an in-built GPS receiver. In this particular embodiment, it is expected that the smartphone be attached on e.g. a windscreen of the vehicle and more particularly arranged in the field of view of the user so as not to impede the safety of the vehicle.

Figure 4:
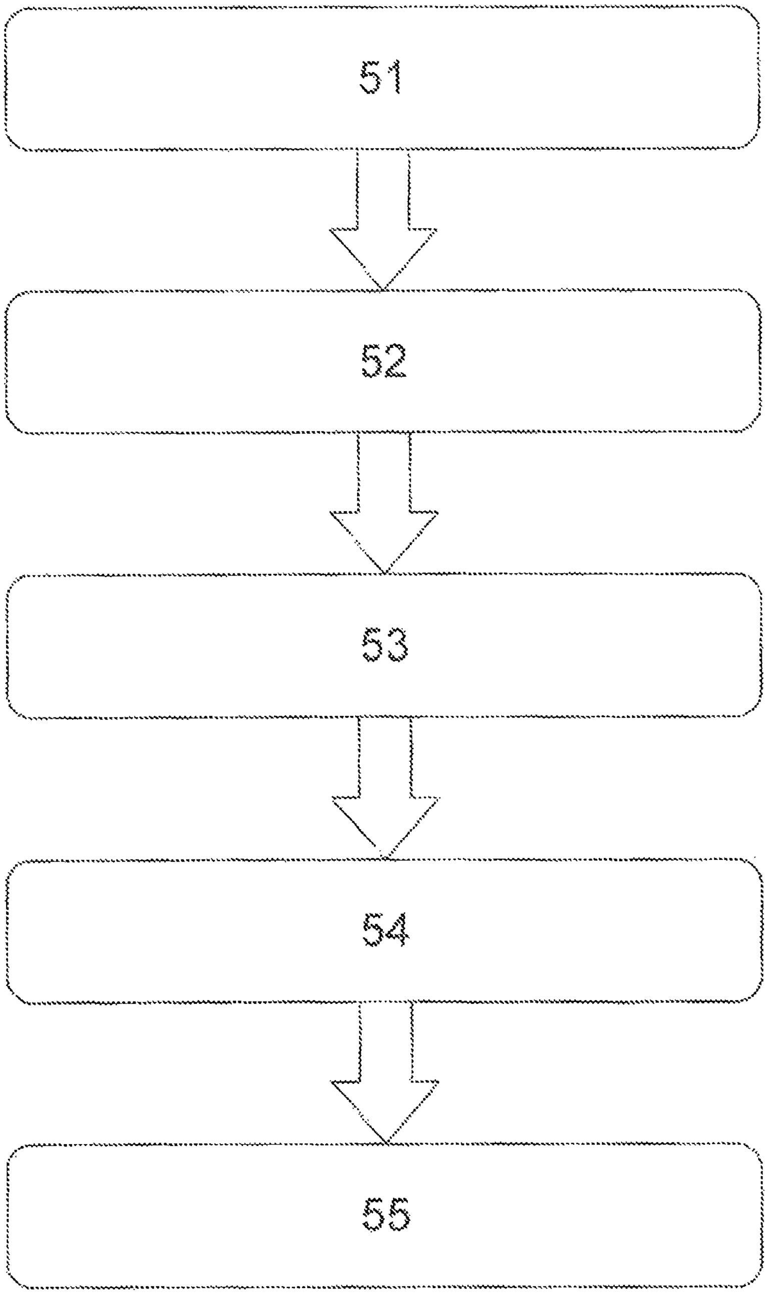
FIG. 4 shows a block diagram providing the steps according to a method of the present invention.

FIG. 4 shows a flow diagram providing the steps according to a method of the present invention. In a first step 51, data messages are input by clients via a user interface. The user interface may be on message server 20, or alternatively by means of a processing means such as a computer, Smartphone, or any other web enabled device. In a second step 52, the data messages are stored, organised, prioritised on the message server 20 prior to transmission to a vehicle. In a third step 53, the message server 20 determines the velocity of a vehicle and selects data messages that can be transmitted based on velocity-dependent protocols. That is, if the vehicle is stationary, then the content of the message is larger than if the vehicle is non-stationary. Next, and in a fourth step 54, the message server 20 transmits data messages over network 18, 20 for receiving by wireless transceiver in vehicle 4. In a final step 55, the message is displayed on the display 6 of vehicle 4 and a successful confirmation message is sent from the message server 20 to the originator of the message.

The invention claimed is:

1. An in-vehicle information delivery system, comprising:

a location and speed determination unit for determining location and speed of a vehicle;

a communication unit for transmitting information to a message server and receiving information from the message server over a wireless communication network, the communication unit transmitting speed data of the vehicle to the message server at a predetermined frequency of time based on average speed of the vehicle and/or preference of a user; and a user interface for communicating information received over the wireless communication network to an occupant of the vehicle;

wherein the message server is adapted to receive location information and/or speed information of the vehicle and to communicate the location information and/or the speed information over the wireless communication network to the vehicle and/or to the user interface;

the message server comprising a filter unit configured to select messages stored on the message server and to select at least one message based on the speed and/or the location of the vehicle and/or the preference of the user; the message server transmitting the at least one selected message to the vehicle and/or the user interface over the wireless communication network.

2. The information delivery system according to claim 1, wherein the message server is a cloud server.

3. The information delivery system according to claim 1, wherein the message server is adapted to receive from at least one client computer messages, to store the messages and to derive the information communicated over the wireless communication network from at least one of the messages.

4. The information delivery system according to claim 3, wherein the messages comprise point of interest messages and/or traffic flow disruption messages and/or emergency type messages from police agencies and/or social media messages and/or healthcare messages and/or synchronised diary and appointments messages and/or news messages and/or advertisements.

5. The information delivery system according to claim 3, wherein the message server is adapted to receive and store filter criteria, including a location, a region, a gender of a person, a time and/or a velocity, in particular in combination with the messages for the client computer.

6. The information delivery system according to claim 1, wherein the velocity of the vehicle is determined by the GPS receiver in the vehicle and/or by an on-board speed sensor using an on-board computer.

7. The information delivery system according to claim 6, wherein the on-board computer is adapted to communicate the velocity of the vehicle and/or the location of the vehicle to a message server.

8. The information delivery system according to claim 1, wherein the on-board computer is adapted to communicate the velocity and/or location of the vehicle in predefined time intervals.

9. The information delivery system according to claim 1, wherein the content of the information is predetermined or provided in substantially real-time and communicated to the user depending on the velocity of the vehicle.

10. The information delivery system according to claim 1, wherein the user interface comprises a Head-Up-Display and/or audio output and/or smartphone device.

11. A method for communicating information over wireless communication network from a vehicle to a message server and from the message server to the vehicle, by an information system according to claim 1, comprising the steps:

inputting messages;

inputting filter criteria for the messages;

storing the messages and the filter criteria;

receiving data, including a velocity and/or a location of a vehicle;

selecting at least one message based on the velocity and/or location;

transmitting information in accordance with the selected message from or to the vehicle.

12. A non-transitory computer-readable medium having computer executable instructions for a computer system, the instructions being adapted to cause the computer system to perform the method of claim 11.

* * * * *